United States Patent

(12) United States Patent
Ye

(10) Patent No.: US 7,915,904 B2
(45) Date of Patent: Mar. 29, 2011

(54) SYSTEM RESISTANCE SIMULATING APPARATUS

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd,, Tu-Cheng, Taipei Hsien (TW)

( * ) Notice: Subject to any disclaimer, the term of this patent is extended or adjusted under 35 U.S.C. 154(b) by 32 days.

(21) Appl. No.: 12/546,640

(22) Filed: Aug. 24, 2009

(65) Prior Publication Data

US 2011/0031987 A1    Feb. 10, 2011

(30) Foreign Application Priority Data

Aug. 5, 2009  (CN) .......................... 2009 1 0305232

(51) Int. Cl.
*G01R 31/00* (2006.01)

(52) U.S. Cl. .................................................. 324/750.28
(58) Field of Classification Search .................. None
See application file for complete search history.

(56) References Cited

U.S. PATENT DOCUMENTS

| 5,184,282 A * | 2/1993 | Kaneda et al. ................ 361/737 |
| 2004/0207980 A1 * | 10/2004 | Kobayashi ..................... 361/685 |
| 2004/0228073 A1 * | 11/2004 | Chuang ........................ 361/679 |

* cited by examiner

*Primary Examiner* — Ha Tran T Nguyen
*Assistant Examiner* — Arleen M Vazquez
(74) *Attorney, Agent, or Firm* — Zhigang Ma

(57) ABSTRACT

A system resistance simulating apparatus includes a case and a resistance adjusting element arranged in the case. The resistance adjusting element includes a number of blocking strips. The blocking strips can be selectively poisoned in the case for simulating system resistance of an electronic device at different power platforms.

7 Claims, 7 Drawing Sheets

SYSTEM RESISTANCE SIMULATING APPARATUS

BACKGROUND

1. Technical Field

The present disclosure relates to simulating apparatuses, particularly, to a system resistance simulating apparatus.

2. Description of Related Art

Electronic devices may have many kinds of power platforms, such as a 60 watt (W) power platform, a 100 W power platform, a 150 W power platform, and a 200 W power platform. When an electronic device of a system, such as a storage device of a storage server, is updated from a low power platform, such as a 60 W power platform, to a high power platform, such as a 100 W power platform, a system resistance of the electronic device using the high power platform is greater than the system resistance of the electronic device using the low power platform. Therefore, the heat dissipating structure of the system needs to be evaluated again to satisfy heat dissipating requirements.

An ordinary method to evaluate the heat dissipating structure of the system is to use an actual updated electronic device. The updated electronic device is arranged in the system, and then evaluated. However, the updated electronic device may be damaged in the evaluating process, and the results may not be accurate.

DETAILED DESCRIPTION

Figure 1:
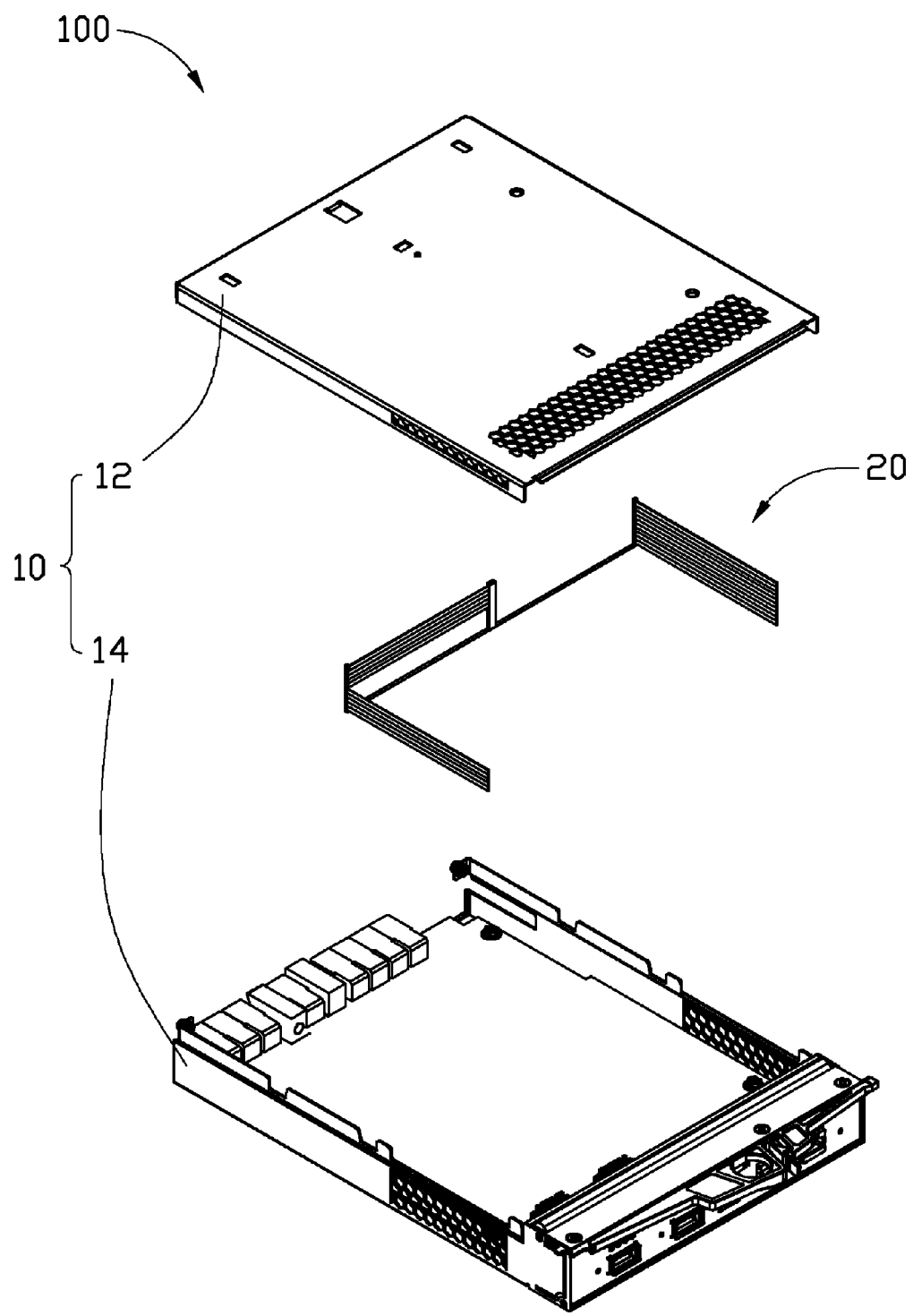
FIG. 1 is an exploded, isometric view of an exemplary embodiment of a system resistance simulating apparatus comprising a resistance adjusting apparatus.

Referring to FIG. 1, an exemplary embodiment of a system resistance simulating apparatus 100 is used to simulate a system resistance of an electronic device of a system, such as a storage device of a storage server, using different power platforms. Here the system resistance refers to heat of the system. The system resistance simulating apparatus 100 includes a case 10 and a resistance adjusting element 20. The case 10 includes an upper cover 12 and a lower cover 14, and a shape of the case 10 is similar to a shape of a case of the electronic device. In other embodiments, the case 10 may be a case of the electronic device, which have no beneficial use or incapable of functioning usefully.

Figure 2:
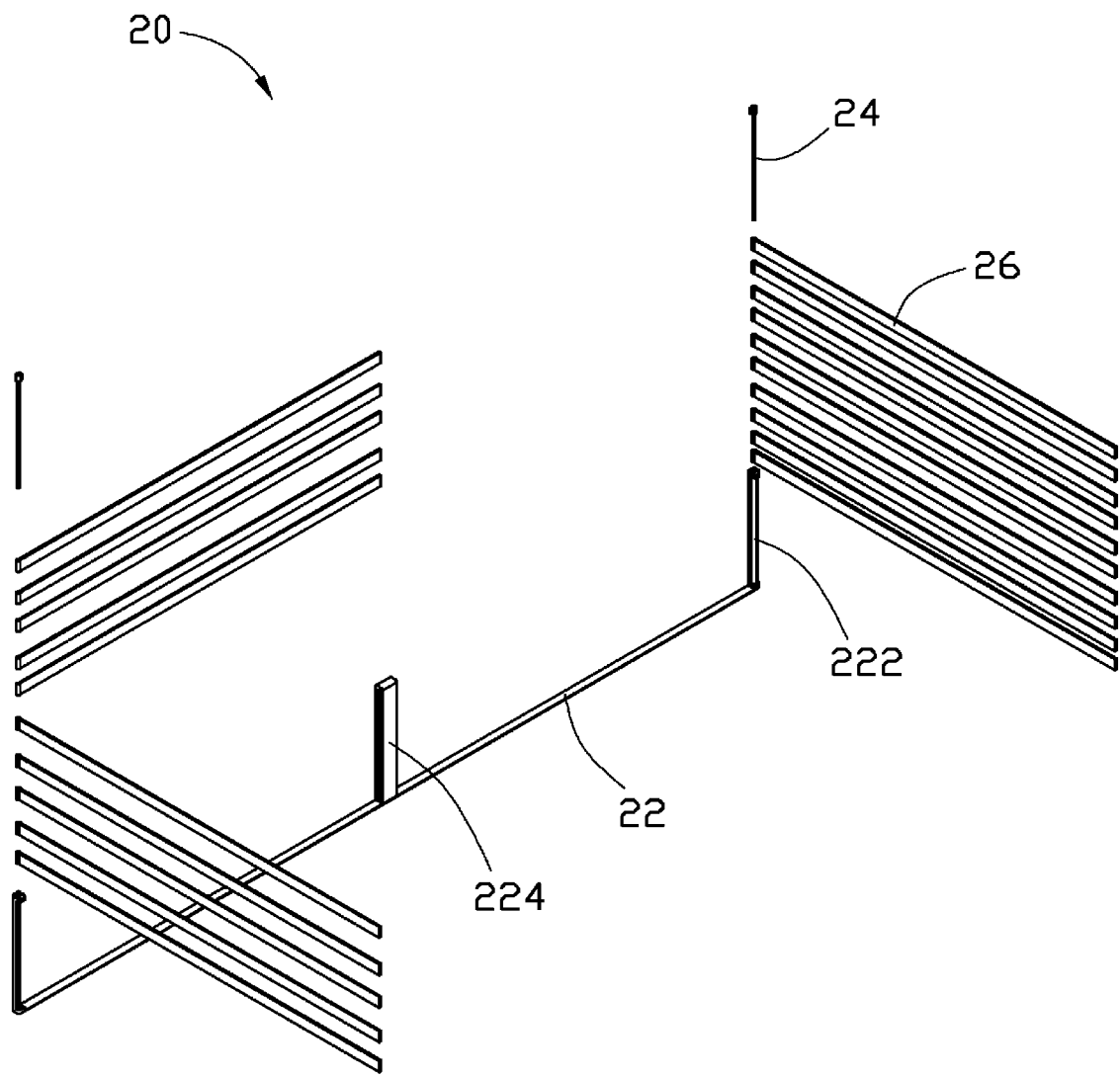
FIG. 2 is an exploded, isometric view of the resistance adjusting apparatus of FIG. 1.
Figure 3:
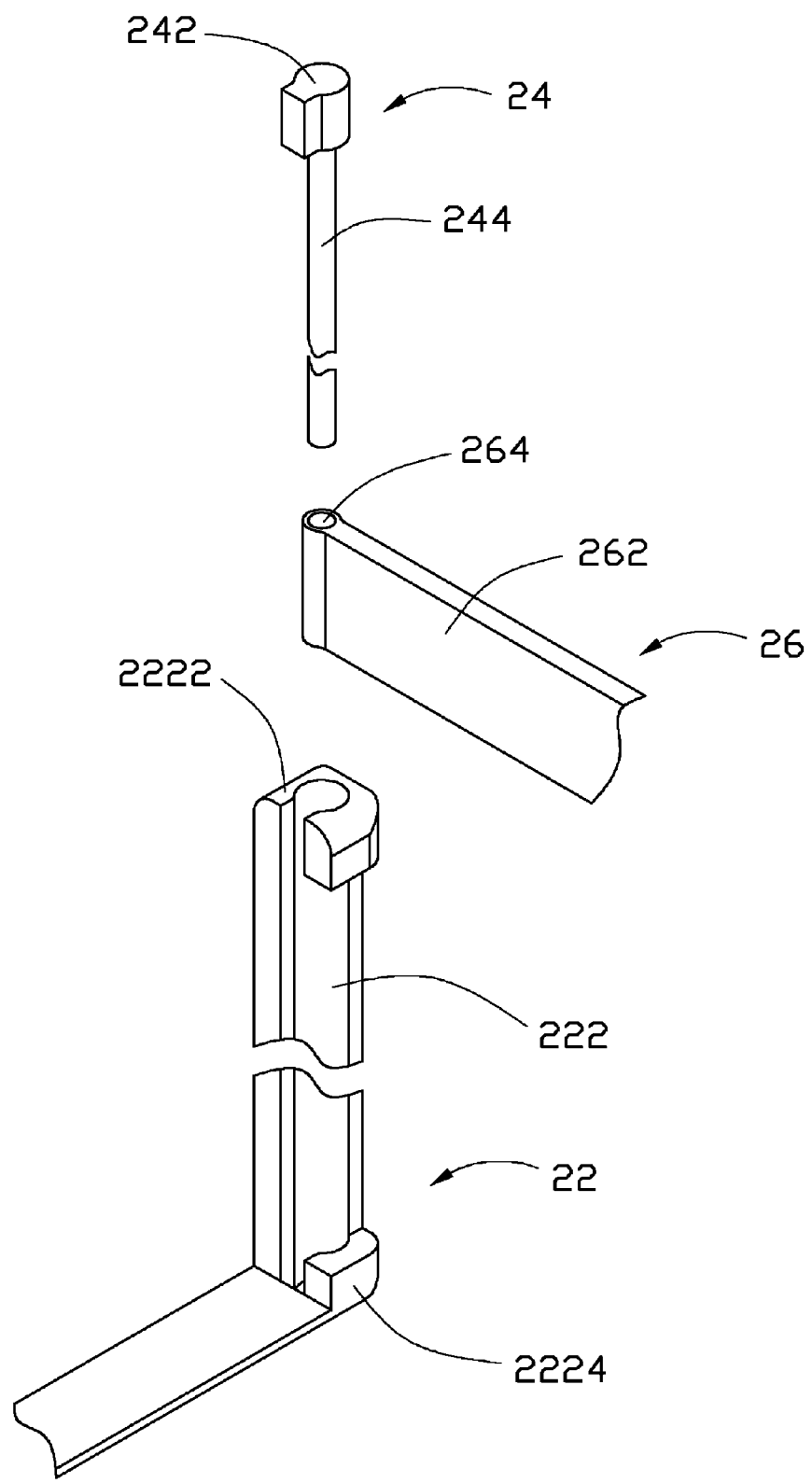
FIG. 3 is an enlarged partial view of the resistance adjusting apparatus of FIG. 2.
Figure 4:
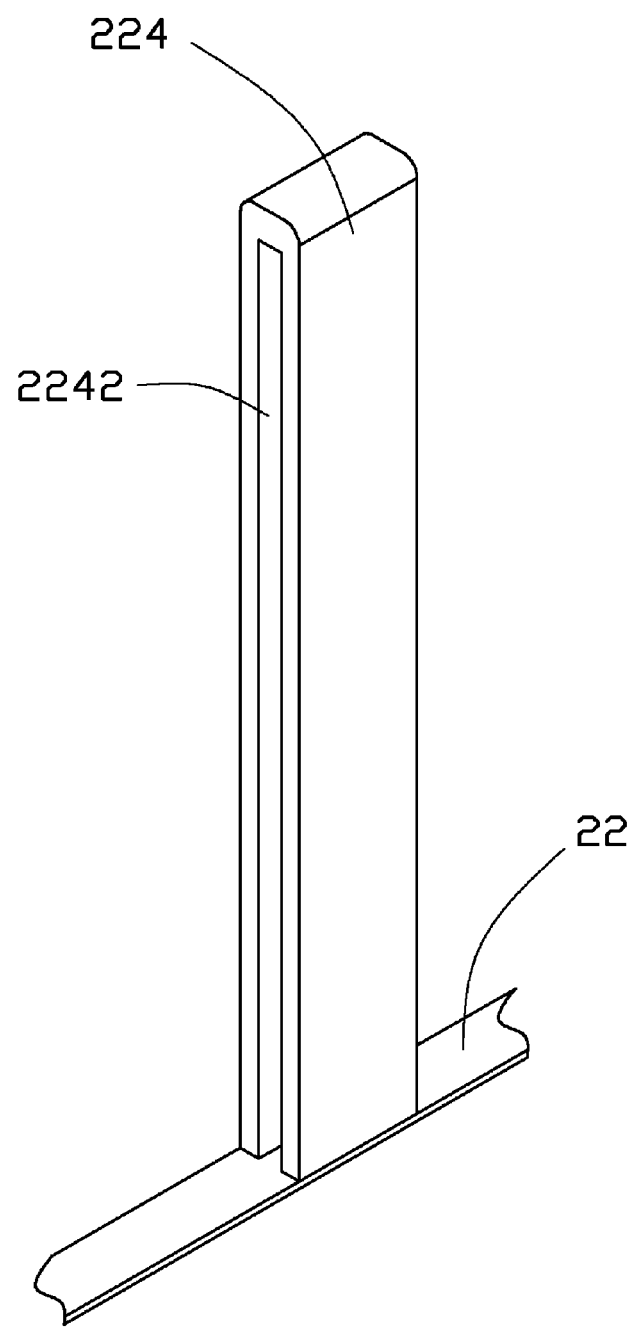
FIG. 4 is another enlarged partial view of the resistance adjusting apparatus of FIG. 2.

Referring to FIGS. 2 to 4, the resistance adjusting element 20 includes a long beam 22, two positioning columns 24, and a plurality of blocking strips 26. Two supporting posts 222 perpendicularly extend up from opposite ends of the beam 22. A positioning post 224 perpendicularly extends up from a center of the beam 22. In one embodiment, there are twenty blocking strips 26.

Each of the supporting posts 222 includes an approximately ring-shaped first positioning portion 2222 at a top end of the supporting post 22 and an approximately ring-shaped second positioning portion 2224 at a bottom end of the supporting post 22. Each of the positioning columns 24 includes a sliding pole 244 and a latching portion 242 formed on a top end of the sliding pole 244.

Each of the blocking strips 26 includes a flat rectangular-shaped main body 262. A rounded-shaped sliding hole 264 is transversely defined in an end of the main body 262. In one embodiment, the blocking strips 26 are made of an elastic material. The positioning post 224 defines a slot 2242 therein, perpendicular to the beam 22 and aligning with the supporting posts 222.

Figure 5:
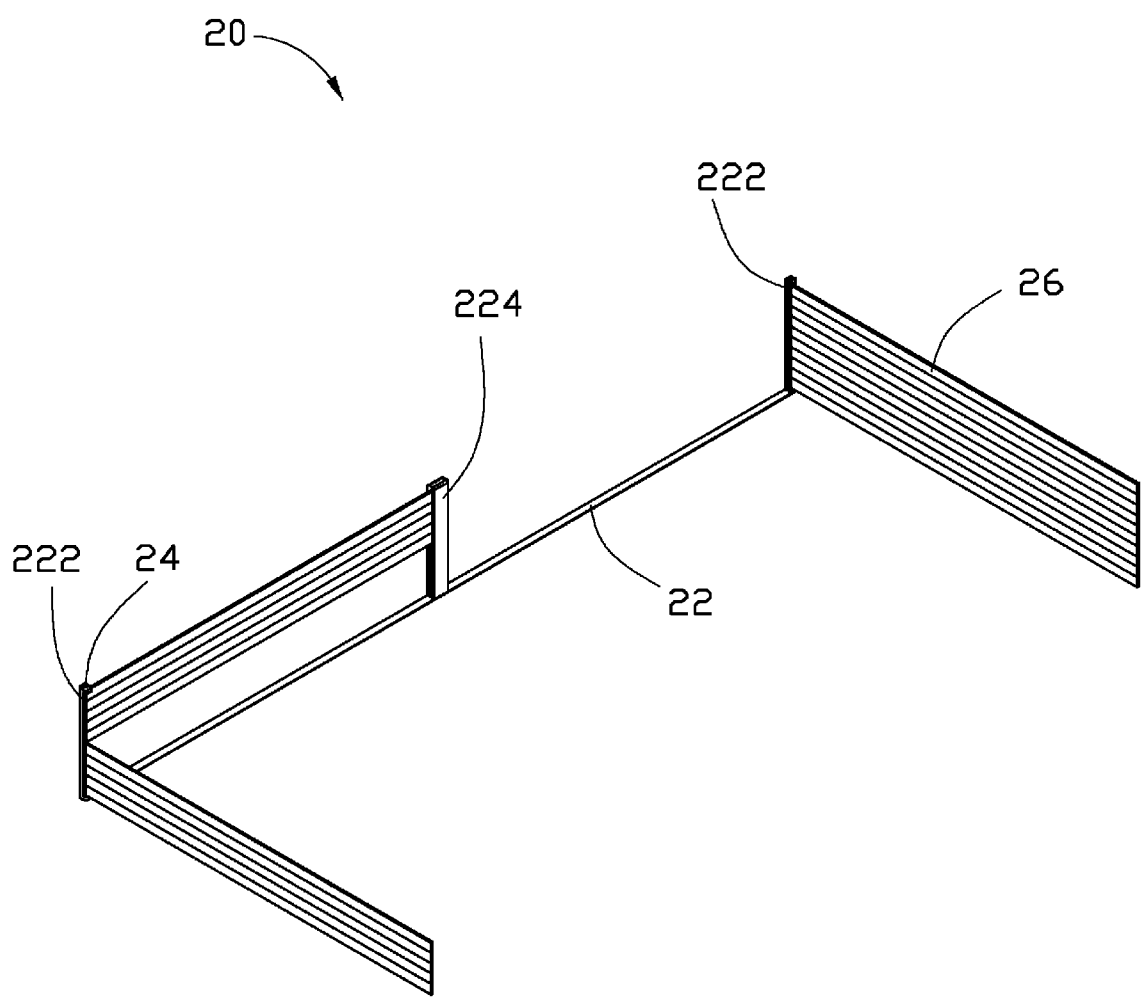
FIG. 5 is an assembled view of the resistance adjusting apparatus of FIG. 2, in a first state.
Figure 6:
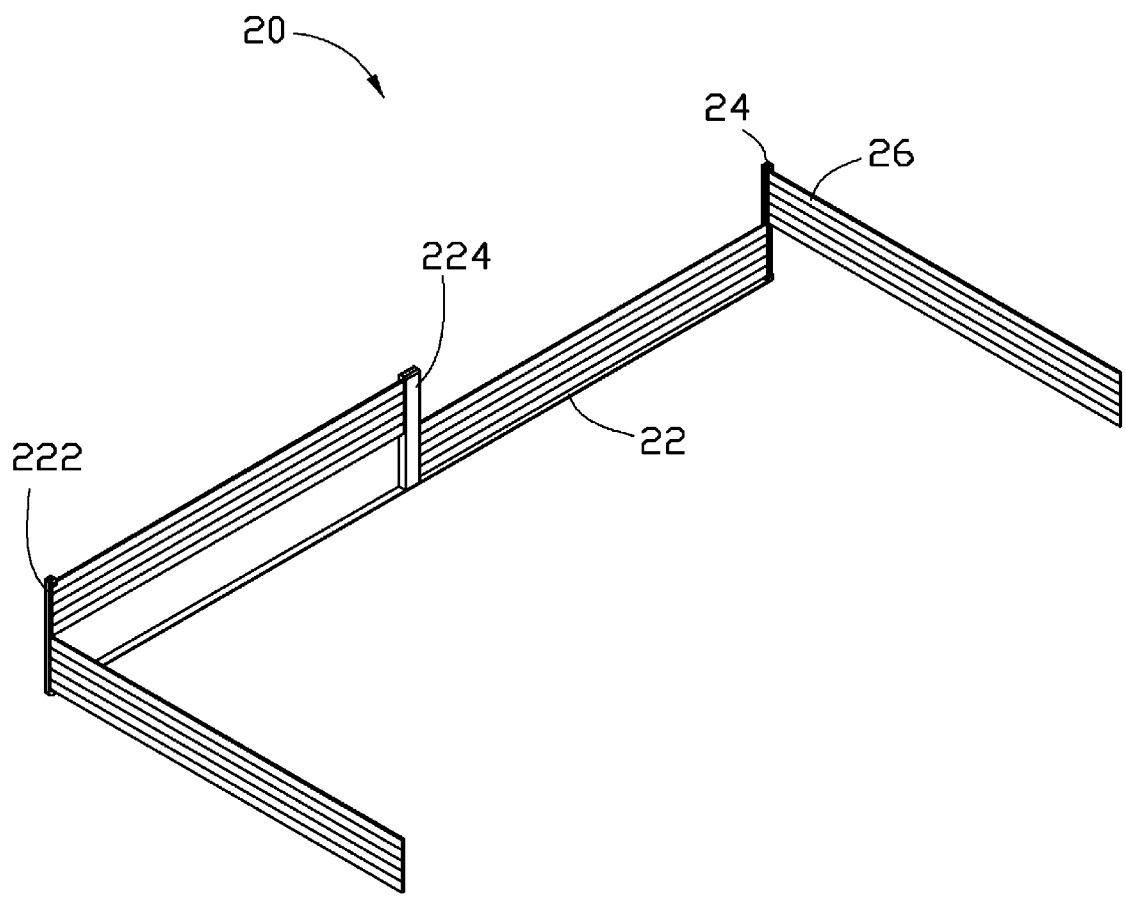
FIG. 6 is an assembled view of the resistance adjusting apparatus of FIG. 2, in a second state.

Referring to FIGS. 5 and 6, in assembling the resistance adjusting element 20, the sliding pole 244 of each positioning column 24 is inserted through the corresponding first positioning portion 2222, the sliding holes 264 of some blocking strips 26, such as ten blocking strips 26, and engaged in the corresponding second positioning portion 2224. At this time, the sliding poles 244 are positioned to the beam 22 and the corresponding blocking strips 26 can be rotated around the sliding poles 244. When distal ends of the blocking strips 26 are inserted into the slot 2242 of the positioning post 224, the blocking strips 26 are positioned on the beam 22. For example, FIG. 5 shows 25% of the blocking strips 26 are positioned on the beam 22 via the positioning post 224. FIG. 6 shows 50% of the blocking strips 26 are positioned on the beam 22 via the positioning post 224.

Figure 7:
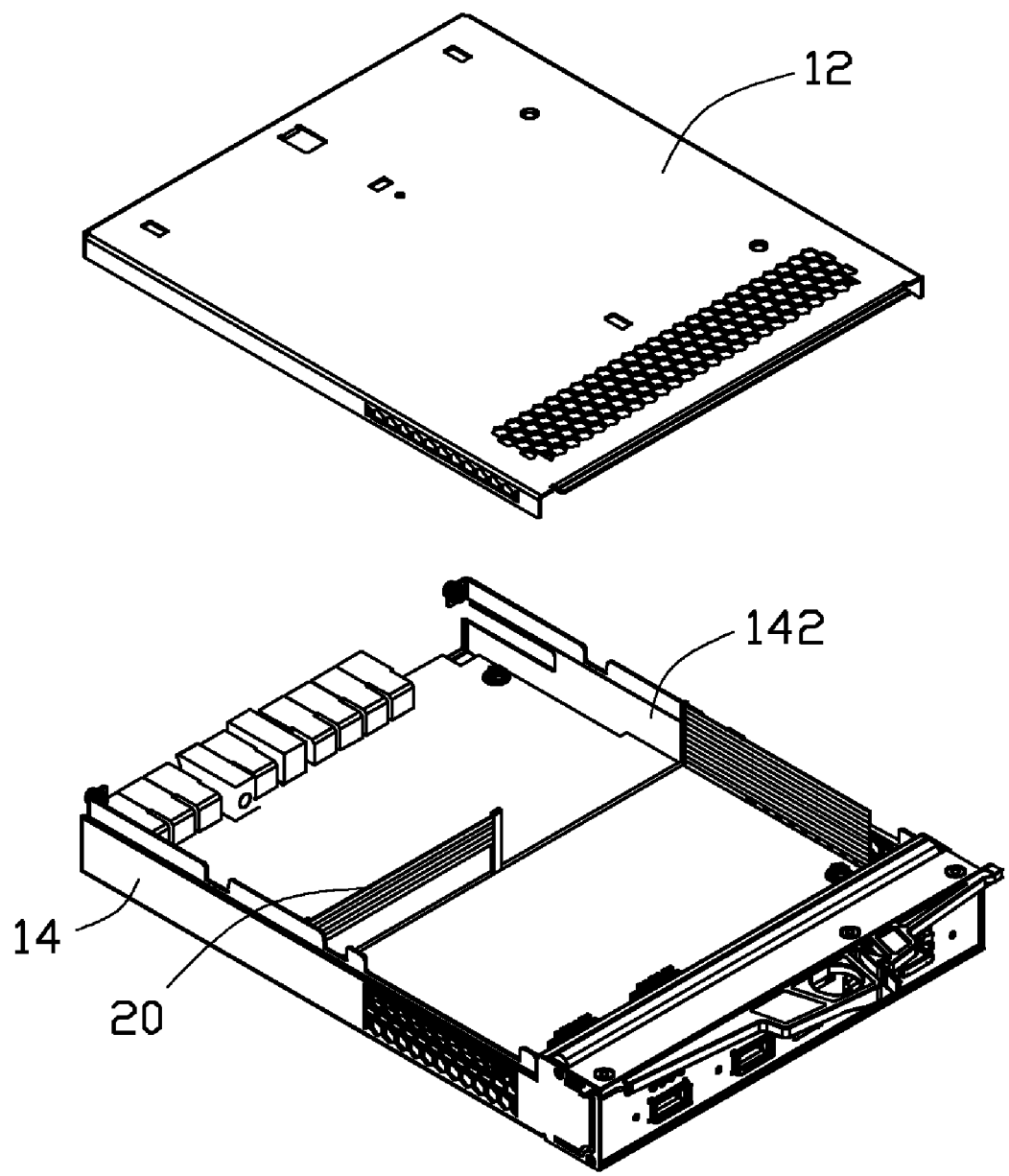
FIG. 7 is a partially assembled view of the system resistance simulating apparatus of FIG. 1.

Referring to FIG. 7, in assembly, the assembled resistance adjusting element 20 is arranged in the lower cover 14 of the system resistance simulating apparatus 100. The un-positioned blocking strips 26 are attached to opposite sidewalls 142 of the lower cover 14. The upper cover 12 may then be covered on the lower cover 14.

In use, the system resistance simulating apparatus 100 is arranged in the system instead of the actual electronic device to simulate the system resistance of the electronic device. Testers can select the number of the blocking strips 26 to position to simulate the system resistances of the electronic device using different power platforms according to requirements. Because the system resistance simulating apparatus 100 has no actual electronic elements therein, the system resistance simulating apparatus 100 cannot be damaged during the evaluating process. Additionally, the system resistance simulating apparatus 100 can simulate an accurate system resistance via adjusting the number of the blocking strips 26 put into position; therefore the evaluating result is accurate.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system resistance simulating apparatus, comprising: a case; and a resistance adjusting element arranged in the case, the resistance adjusting element comprising: a beam; two supporting posts extending up from opposite ends of the beam; a positioning post extending up from a center of the beam; and a plurality of blocking strips each comprising a first end and a second end opposite to the first end, wherein the first ends of some blocking strips are detachably mounted to one of the positioning columns, the first ends of the other blocking strips are detachably mounted to the other positioning column; wherein the positioning post positions the second ends of the plurality of blocking strips.

2. The system resistance simulating apparatus of claim 1, wherein the case comprises a lower cover and an upper cover covered on the lower cover to enclose the resistance adjusting element.

3. The system resistance simulating apparatus of claim 1, wherein the resistance adjusting element further comprises two positioning columns, each of the supporting posts comprises an approximately ring-shaped first positioning portion at a top end of the supporting post and an approximately ring-shaped second positioning portion at a bottom end of the supporting post, wherein top and bottom ends of each positioning column are engaged with the first and second positioning portions, wherein the first ends of the plurality of blocking strips are rotatably mounted to the positioning columns, respectively.

4. The system resistance simulating apparatus of claim 3, wherein each of the positioning columns includes a sliding pole corresponding to the second positioning portion and a latching portion formed on the top end of the sliding pole corresponding to the first positioning portion.

5. The system resistance simulating apparatus of claim 1, wherein each of the plurality of blocking strips includes a flat rectangular-shaped main body, a sliding hole is defined in a first end of the main body.

6. The system resistance simulating apparatus of claim 1, wherein the positioning post defines a slot therein, aligning with the supporting posts.

7. The system resistance simulating apparatus of claim 1, wherein the plurality of blocking strips are made of elastic material.

* * * * *